United States Patent [19]

Sakakibara

[11] 4,190,026
[45] Feb. 26, 1980

[54] AUTOMOBILE SPEED CONTROL METHOD AND SYSTEM

[75] Inventor: Naoji Sakakibara, Chiryu, Japan

[73] Assignee: Aisin Seiki Co., Ltd., Japan

[21] Appl. No.: 837,291

[22] Filed: Sep. 27, 1977

[30] Foreign Application Priority Data

Oct. 26, 1976 [JP] Japan ............................ 51-129173

[51] Int. Cl.$^2$ ............................................. B60K 31/00
[52] U.S. Cl. .................................... 123/102; 180/179
[58] Field of Search .............. 123/102, 103 R, 103 B; 180/105 E

[56] References Cited

U.S. PATENT DOCUMENTS

| | | | |
|---|---|---|---|
| 3,381,771 | 5/1968 | Granger | 123/102 |
| 3,752,252 | 8/1973 | Sakakibara | 123/102 |
| 3,766,367 | 10/1973 | Sumiyoshi | 123/102 |
| 3,921,751 | 11/1975 | Sakakibara | 123/103 R |
| 4,041,911 | 8/1977 | Steele | 123/103 R |
| 4,056,157 | 11/1977 | Kawata | 123/102 |

*Primary Examiner*—John H. Wolff
*Attorney, Agent, or Firm*—Staas & Halsey

[57] ABSTRACT

An automobile speed control for maintaining actual road speed at a preselected driving speed. To control throttle position so as to maintain the actual road speed at the preselected speed, a first error signal is obtained from a comparator. The first error signal is, for the purpose of stabilizing the actual road speed, compared with a negative feedback signal to generate the final throttle position control signal. The negative feedback signal is obtained from an intake air flow rate detector to prevent increasing the force required for operating the throttle valve control mechanism and to facilitate installation of the speed control system.

5 Claims, 1 Drawing Figure

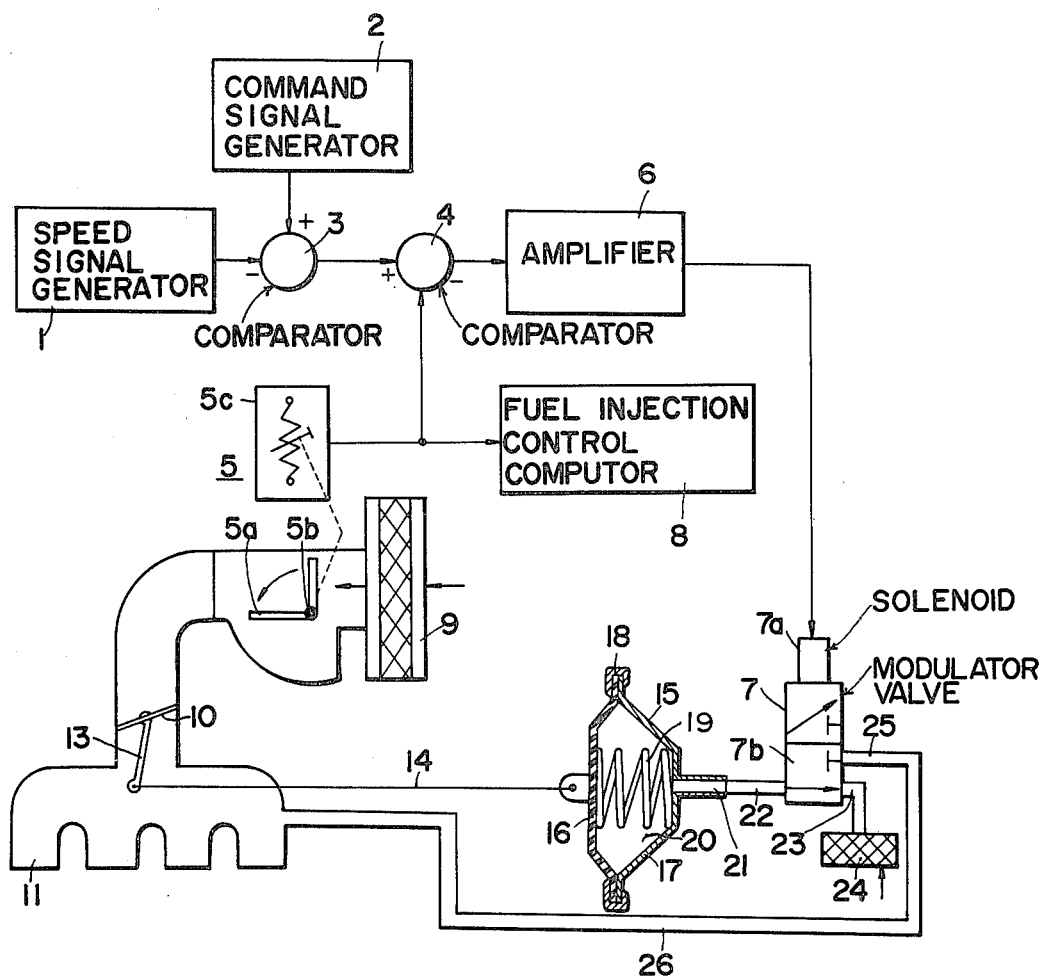

ND SYSTEM

BACKGROUND OF THE INVENTION

The present invention relates to improvements in an automobile speed control method and system. More particularly, the invention relates to a speed control method and system for maintaining the speed of an automobile at a constant preselected value.

Speed controls for automobiles are now in commercial use, in which the road speed of the automobile is compared with a preselected value to generate a throttle position feedback signal for controlling the throttle valve at a position at which the road speed balances with the preselected value. Generally speaking, automatic speed control for automobiles requires stabilization of the speed control system. If the stabilization should be insufficient, the speed will fluctuate around the preselected value and this hunting will detrimentally affect the performance of the automobile. Hunting can be prevented by degrading the responsiveness and accuracy of the speed control system. However, hunting can also be prevented without degradation by employing negative feedback control of the throttle valve, as shown in U.S. Pat. No. 3,381,771(Patented May 7, 1968; Cl.180-105). In the invention of the aforesaid patent, an actual speed indication signal from the tachometer generator of an automobile speedmeter and a preselected speed command signal from a speed set potentiometer are supplied to a comparator circuit to generate an error signal to control the throttle valve position, and then the error signal is supplied to a differential amplifier circuit together with a throttle position feedback signal(the negative feedback signal) from a feedback potentiometer connected to the throttle valve. An output differential signal from the differential amplifier regulates the position of the throttle valve. The negative feedback stabilizes the movement of the throttle valve and thereby smooths the ride of the automobile. However, there are difficulties in this system for supplying negative feedback of the throttle valve position. It requires a transducer, such as a potentiometer which is linked to the throttle drive system (from the accelerator pedal to the throttle valve) and which generates the throttle position feedback signal, and space to install the transducer is limited (since the throttle drive system is installed in a comparatively narrow space and transducer vibration should be prevented). Also connecting the transducer to the throttle drive system increases the load on the throttle drive system, which then requires more force for operation.

SUMMARY OF THE INVENTION

One object of the present invention is to obtain a negative feedback signal to stabilize the speed control of the automobile without connecting the transducer to the throttle drive system. Another object of the present invention is to facilitate the operation of the transducer for generating the negative feedback signal. Yet another object of the present invention is to provide an automobile speed control system which can be easily installed in an automobile and which has stabilized preselected speed control characteristics.

According to the present invention, a first electric signal which indicates the actual road speed of the automobile is compared with a second electric signal which indicates a driving command speed. A first error signal is generated which indicates the difference between the actual road speed and the driving command speed preselected by a driver. Then the first error signal is compared with a third electric signal which indicates the intake air flow rate of the engine of the automobile so as to generate a throttle valve position control signal. The intake air flow rate when the vehicle is traveling at a steady speed is approximately proportional to the throttle position and engine rotational speed. Therefore the third electric signal may be considered to be the negative feedback signal needed for stabilizing the preselected speed control characteristic of the automobile. The third electric signal, which indicates the intake air flow rate, is easily obtained from a signal generator means such as a potentiometer which is linked to a flow rate detector means, such as a fin or butterfly piece, which will be driven by the intake air flow. The intake air flow passage is large enough to accommodate the fin or butterfly piece, and the outer space around the passage is sufficient to install the potentiometer. Therefore installation on the signal generator means is easy, and the load of the throttle valve is reduced. The output signal of the potentiometer, i.e., the third electric signal, may be availed for fuel injection control in a electronic fuel injection control system.

BRIEF DESCRIPTION OF THE DRAWINGS

The FIGURE is a pictorial functional diagram of the automobile speed control system of an embodiment of the present invention.

DESCRIPTION OF THE PREFERRED EMBODIMENT

Referring to the FIGURE, there is shown a preferred embodiment of the invention, which comprises an actual road speed signal generator 1 which generates a first electric signal, a driving speed command signal generator 2 which generates a second electric signal, a first comparator 3 which compares the first and second signals and generates a first error signal, a second comparator 4 which compares the first error signal with a third electric signal and generates a throttle valve position control signal, a flow rate detector 5 comprising a potentiometer 5c and a butterfly piece 5a in the intake manifold, an amplifier 6 which amplifies the throttle valve position control signal up to an electric energy level sufficient to operate and control a solenoid valve 7, and a vacuum actuator 15 which is operated by the solenoid valve 7 so as to control the position of the throttle valve 10. An electronic fuel injection control computor 8 receives the third electric signal, i.e., an intake air flow rate signal, and generates a fuel supply control signal.

The actual road speed signal generator 1 is an electric signal generator such as a tachometer. The driving speed command signal generator 2 is an electric signal generator such as a potentiometer which will be pre-set by the driver. The comparator 3 and 4 may be any type of comparator circuit which generates a differential error signal between two input signals. The foregoing generators 1 and 2 and comparators 3 and 4 as well as the potentiometer 5c of the flow rate detector 5 are well known in the arts and described in the foregoing U.S. Pat. No. 3,381,771.

The potentiometer 5c of the flow rate detector 5 is linked with the axis 5b of the butterfly piece 5a as shown by a dotted line. The intake air flow, which comes into intake manifold 11 through an air cleaner 9 and is controlled by the throttle valve 10, rotates the butterfly piece 5a on its axis 5b. The rotational angle of the butterfly piece 5a (on axis 5b), in the counterclockwise direction as illustrated in the FIGURE, is proportional to the intake air flow rate. The potentiometer 5c is driven by the rotation of butterfly piece 5a. Therefore the potentiometer 5c generates the third electric signal which indicates the intake air flow rate. The intake air flow rate increases or decreases in correspondance with the rotational angle (or position) of the throttle valve 10. Thus the output signal of the potentiometer 5c corresponds to the throttle position.

Throttle lever 13 is connected at axis of the throttle valve 10. The lever 13 is connected to diaphragm 16 of the vacuum actuator 15 by a link means such as a wire 14. The position of the throttle valve 10 opens so as to allow passage of more air when the diaphragm 16 moves to the right. The diaphragm 16 together with a housing member 17, a clip member 18 and a compression spring 33 form the vacuum actuator 15. The interior chamber 20 of the vacuum actuator 15 is exposed either to atmospheric pressure or to vacuum pressure through the modulator valve 7b of the solenoid valve 7. The operation of valve 7b depends upon the amplified throttle valve position control signal delivered to solenoid 7a of the solenoid valve 7. The compression spring 19 in the vacuum actuator 15 tends to expand chamber 20 while the pressure of the atmospher pressing against diaphragm 16 works against the spring force, displacing the diaphragm 16 until it achieves an equilibrium position. Pipe 21 is connected between the chamber 20 of the vacuum actuator 15 and a common inlet port 22 of the modulator valve 7b. A normally opened outlet port 23 of the modulator valve 7b is connected to the atmospher pressure through an air cleaner 24, and a normally closed outlet port 25 of the modulator valve 7b is connected to the intake manifold 11 through a rubber hose 26.

There described construction of the preferred embodiment of the present invention, as illustrated in the FIGURE, has now been described. Operation of the embodiment is described hereinafter.

The second electric signal, representing a preselected driving command speed which is generated by the driving speed command signal generator 2 in accordance with the setting determined by the driver, as well as the first electric signal, which indicates the actual road speed of the automobile and is generated by the actual road speed signal generator 1, are supplied to the first comparator 3. The comparator 3 generates the first error signal, which represents the deviation of the actual road speed from the preselected driving command speed. It will be apparent to those skilled in the art that if the throttle position were controlled by the first error signal, through amplifier 6 and vacuum actuator 15 then ON-OFF fluctuation of the throttle valve 10 would occur the preselected command speed. This would cause the actual speed of the automobile to hunt, or fluctuate undesirably around the preselected command speed. Such fluctuations are attributable to time delay as the real road speed responds to the throttle valve position. Hunting could be prevented by lowering the sensitivity of the vacuum actuator 15, but the performance of the speed control would deteriorate. These problems are resolved by employing "lead compensation" in the throttle position control, in which the throttle valve 10 is controlled to open or close a moment before the real actual road speed falls down to or rises up to the preselected command speed. This lead compensation is employed in the present invention by comparing the first error signal with the third electric signal, which indicates the intake air flow rate, and generating the second error signal as the throttle valve position control signal. Namely, the comparator 4 receives the first error signal and the intake air flow rate signal from comparator 3 and potentiometer 5c, and generates the throttle valve position control signal which corresponds to the difference between the first error signal and the intake air flow rate. The throttle valve position control signal controls the throttle valve 10 through solenoid valve 7 and vacuum actuator 15 so as to operate the throttle valve 10 a moment before the actual road speed comes to the preselected command speed. For example, in a control mode of acceleration up to the command speed, the throttle valve position control signal will be deenergized gradually in correspondance with the increase of the intake air flow rate and finally indicates, a moment before the command speed, that the real road speed is equal to the command speed. In the control mode of acceleration up to the preselected command speed, solenoid valve 7 is operated by the output of amplifier 6 so as to connect commom inlet 22 to normally closed outlet 25. Thus interior chamber 20 of vacuum actuator 15 is connected to intake manifold 11 through modulator valve 7b and rubber hose 26. Therefore with reference to the FIGURE, diaphragm 16 moves in the right direction against the force of compression spring 19, and throttle valve 10 rotates to open the interior air flow passage. As a result the intake air flow rate increases (also actual road speed increases). The butterfly piece 5a rotates in a counterclockwise direction and the output signal level of the potentiometer 5c rises. This decreases the output signal level of comparator 4, and the output energy level of amplifier 6 decreases. When solenoid valve 7 is deenergized, common inlet port 22 is connected to atmospheric pressure through normally opened outlet port 23 and air cleaner 24. Thus the pressure in the chamber 20 of vacuum actuator 15 increases to atmospheric pressure, which moves diaphragm 16 to the left, closing throttle valve 10. Closing throttle valve 10 decreases the intake air flow rate, and the level of the intake air flow rate signal from potentiometer 5c falls. Consequently the level of the throttle position control signal from comparator 4 rises. This increases the amplified signal to solenoid valve 7, and vacuum actuator 15 operates to open throttle valve 10. This serial closing and opening control operation of the system is continuous and high speed. Therefore, the mean pressure in the chamber 20 of vacuum actuator 15 is determined by the ratio of the time solenoid valve 7 is energized and deenergized, and increases or decreases smoothly. Thus the mean pressure in the chamber 20 of vacuum actuator 15 corresponds to the speed difference between the actual road speed and the preselected command speed. Consequently, the position of throttle valve 10 corresponds to the speed difference. The throttle valve 10 smoothly follows the difference and does not fluctuate. The actual road speed of the automobile does not fluctuate.

Supplying the output signal of potentiometer 5c to comparator 4 will not interfere with the electronic fuel injection control computor 8 be prevented by employing a high input impedance comparator is used as the comparator 4. If the input impedance of comparator 4 is more than 1000 times the input impedance of computor 8, the input voltage drop to computor 8 will be under 0.1%, which will not interfere the operation of computor 8. Interference with computer 8 will be prevented completely by employing a FET (Field Effect Transistor) at the input stage of comparator 4.

As described hereinafter, the control system of the present invention provides the automobile with stabilized and smooth speed control without hunting, overshoot or undershoot by employing the intake air flow rate signal as the negative feedback signal to generate the throttle valve position control signal. Also the control system is easily incorporated in the automobile and does not increase the force required for operating the throttle control mechanism, because the intake air flow rate rather than the throttle valve position is detected. The flow rate detector 5 is already installed in automobiles with electronic fuel injection control systems, in which case installation of the system of the present invention is quite easy. This makes the cost of installing the speed control system cheap, and an additional throttle position detector (potentiometer) need not be installed.

Obviously many modifications and variations of the present invention are possible in the light of the above teachings. For example, other flow rate detectors, such as thermistor types or eddy current types may be employed for the flow rate detector 5. Also the throttle valve 10 may be controlled by an electric motor which is controlled by the output of amplifier 6. It is, therefore, to be understood that, within the scope of the appended claims, the invention may be practiced otherwise than as specifically disclosed.

The invention claimed is:

1. A speed control system for use with a motor vehicle having an engine coupled with an intake manifold housing a throttle valve, said speed control system being of the type including a tachometer which is operatively connected to said engine and which generates a first signal corresponding to the vehicle's speed; a second signal generator which generates a preselected driving speed signal; a third signal generator which generates a negative feedback signal; comparator means for receiving the first signal, the preselected driving speed signal and the negative feedback signal, comparing those three signals, and generating a throttle valve position control signal; and means responsive to the throttle valve position control signal for moving the throttle valve, wherein the improvement comprises: the third signal generator is an intake air flow rate detector which is operated by the intake air flow into the intake manifold of the engine of the motor vehicle, the intake air flow rate being detected at a point before the incoming air reaches the throttle valve.

2. A speed control system as claimed in claim 1, wherein the intake air flow rate detector comprises a flow rate sensor rotated by the intake air flow and an electric signal generator operationally connected to the flow rate sensor means.

3. A speed control system as claimed in claim 2, wherein the flow rate sensor is a butterfly piece in the intake air flow passage and the electric signal generator is a potentiometer operationally connected to the rotatable axis of the butterfly piece.

4. A speed control system as claimed in claim 1, wherein the means responsive to the throttle valve position control signal includes an amplifier, a solenoid valve energized by the amplified throttle control signal, and a vacuum actuator which is driven by the pressure in the intake manifold through the solenoid valve.

5. A speed control system for use with a motor vehicle having an engine with an intake manifold and a throttle valve, comprising:
a first signal generator which generates a tachometer signal;
a second signal generator which generates a preselected driving speed signal;
a third signal generator having a butterfly piece in the intake air flow passage of the engine of the automobile and a potentiometer operationally connected to the rotatable axis of the butterfly piece, the butterfly piece being positioned to encounter incoming air before it reaches the throttle valve;
a first comparator which compares the tachometer signal with the preselected driving speed signal to generate a first error signal;
a second comparator which compares the first error signal with the output voltage of the potentiometer of the third signal generator to generate a throttle valve position control signal; and
means responsive to the throttle position control signal for producing mechanical movement of the throttle valve, said means comprising an amplifier, a solenoid valve which is energized by the amplified throttle valve position control signal, and a vacuum actuator which is driven by a pressure in the intake manifold through the solenoid valve.

* * * * *